US010470080B2

(12) United States Patent
Fiaschi et al.

(10) Patent No.: US 10,470,080 B2
(45) Date of Patent: Nov. 5, 2019

(54) METHODS AND APPARATUS FOR NETWORK COMMUNICATION OVER AN INTERFACE

(71) Applicant: Telefonaktiebolaget LM Ericsson (publ), Stockholm (SE)

(72) Inventors: Giovanni Fiaschi, Stockholm (SE); Géza Gaál, Budapest (HU); Shahryar Khan, Stockholm (SE); Hans-Åke Lund, Göteborg (SE); Jonas Rosenberg, Stockholm (SE); Balázs Varga, Budapest (HU); Shuo Yang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/759,405

(22) PCT Filed: Sep. 14, 2015

(86) PCT No.: PCT/EP2015/070949
§ 371 (c)(1),
(2) Date: Mar. 12, 2018

(87) PCT Pub. No.: WO2017/045697
PCT Pub. Date: Mar. 23, 2017

(65) Prior Publication Data
US 2018/0184328 A1    Jun. 28, 2018

(51) Int. Cl.
*H04W 28/08*   (2009.01)
*H04W 76/12*   (2018.01)
(Continued)

(52) U.S. Cl.
CPC .......... *H04W 28/08* (2013.01); *H04L 47/125* (2013.01); *H04L 47/2408* (2013.01);
(Continued)

(58) Field of Classification Search
CPC ..... H04W 76/02; H04W 72/12; H04W 76/12; H04W 28/08; H04W 28/0268;
(Continued)

(56) References Cited

U.S. PATENT DOCUMENTS

2009/0016282 A1    1/2009   Gasparroni et al.
2014/0226646 A1*   8/2014   Nishigori ............... H04W 8/04
                                                        370/338
(Continued)

OTHER PUBLICATIONS

3GPP, "3rd Generation Partnership Project; Technical Specification Group Core Network and Terminals; General Packet Radio System (GPRS) Tunnelling Protocol User Plane (GTPv1-U) (Release 12)", 3GPP TS 29.281 V12.1.0, Dec. 2014, pp. 1-27.
(Continued)

*Primary Examiner* — Mewale A Ambaye
(74) *Attorney, Agent, or Firm* — Sage Patent Group

(57) ABSTRACT

A method (100), performed by a first network node in a communication network, is disclosed. The first network node is connected to a second network node of the communication network via an interface implementing a GPRS Tunnelling Protocol (GTP). The method comprises selecting a user data packet for transmission to the second network node (110) and identifying information about the user data packet which impacts how the user data packet should be routed over the interface (120). The method further comprises encoding the identified information into a User Datagram Protocol (UDP) header of the user data packet (130) and forwarding the user data packet to the interface for transmission to the second network node (140). Another method (300) is disclosed, performed by a node in a Mobile Transport Network, the Mobile Transport Network providing a GTP based interface between a first network node of a communication network and a second network node of the communication network. The method comprises receiving a
(Continued)

user data packet from the first network node for transmission over the interface to the second network node (310), extracting, from a UDP header of the user data packet, information about the user data packet which impacts how the user data packet should be routed over the interface (320) and using the extracted information in a routing decision to forward the user data packet to the second network node (330). Also disclosed are a communication network node (500, 700), a Mobile Transport Network node (600, 800) and a computer program configured to carry out methods in a communication network node and a Mobile Transport Network node.

48 Claims, 9 Drawing Sheets

(51) Int. Cl.
  *H04L 29/06* (2006.01)
  *H04L 12/803* (2013.01)
  *H04L 12/851* (2013.01)
  *H04W 28/02* (2009.01)
(52) U.S. Cl.
  CPC ........ *H04L 65/1069* (2013.01); *H04L 65/605* (2013.01); *H04L 65/80* (2013.01); *H04W 28/0268* (2013.01); *H04W 76/12* (2018.02)

(58) Field of Classification Search
  CPC ............... H04L 47/125; H04L 47/2408; H04L 65/1069; H04L 65/80
  See application file for complete search history.

(56) References Cited

U.S. PATENT DOCUMENTS

| 2014/0341109 | A1* | 11/2014 | Cartmell | ............... | H04L 45/308 |
| | | | | | 370/328 |
| 2015/0071169 | A1* | 3/2015 | Wang | ...................... | H04W 8/02 |
| | | | | | 370/328 |
| 2015/0117310 | A1* | 4/2015 | Zexian | .................. | H04L 45/245 |
| | | | | | 370/328 |

OTHER PUBLICATIONS

3GPP, "3rd Generation Partnership Project; Technical Specification Group Core Network and Terminals; General Packet Radio System (GPRS) Tunnelling Protocol User Plane (GTPv1-U) (Release 13)", 3GPP TS 29.281 V13.0.0, Sep. 2015, pp. 1-28.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP TS 23.401 V13.2.0, Mar. 2015, pp. 1-313.

* cited by examiner

METHODS AND APPARATUS FOR NETWORK COMMUNICATION OVER AN INTERFACE

TECHNICAL FIELD

The present invention relates to methods performed in a first network node of a communication network and in a node of a Mobile Transport Network. The present invention also relates to a computer program product configured, when run on a computer, to carry out methods performed in a first network node of a communication network and in a node of a Mobile Transport Network.

BACKGROUND

In existing mobile communication networks, user data is collected via Radio Base Stations of a Radio Access Network (RAN), and then sent via terrestrial transport networks towards nodes of a Core Network. Network components implementing the transport from RAN to Core Network nodes are generally referred to as a Mobile Transport Network (MTN) or Mobile Backhaul Network (MBH). The MTN implements an IP packet transport service (IP TNL) for the RAN, and the main interfaces used to transport user traffic between the RAN and the Core Nodes are implemented with the GPRS Tunnelling Protocol User Plane (GTPv1-U protocol), defined in TS 29.281.

Examples of interfaces implementing the GTPv1-U protocol are set out in TS 29.281 and some of these interfaces are illustrated in FIG. 1, which shows an example LTE Radio and Core Network, taken from 3GPP TS 23.401. Example interfaces include, in 2G networks the Gn and Gp interfaces of the General Packet Radio Service (GPRS), in 3G networks the Iu, Gn and Gp interfaces of the UMTS system, and in 4G and 5G networks the S1-U, X2, S4, S5, S8 and S12 interfaces of the Evolved Packet System (EPS). The S1-U interface is a typical example of interfaces implementing the GTPv1-U protocol. The S1-U interface is illustrated in FIG. 1 between the eNodeBs of the E-UTRAN and the Serving Gateway (SGW) core node. The S1-U interface transports flows for 4G networks and will also in the future transport flows in 5G networks.

FIG. 2 illustrates the protocol stack of the GTPv1-U protocol used to implement the S1-U interface between an eNodeB and the SGW. The GTPv1-U protocol stack multiplexes several user tunnels onto the same S1-U interface. In order to distinguish the tunnels, the GTP protocol defines a Tunnel Endpoint Identifier (TEID) for each user tunnel carrying user IP data. The GTP protocol itself is in turn carried over UDP packets, with common practice being to use a single pair of UDP source and destination ports for a given GTP tunnel in a radio base station. The UDP is in turn carried by IP packets.

User traffic carried over an interface may be of different kinds, including for example data and voice traffic, and may require different treatment as regards Quality of Service (QoS). QoS information contained in a user data packet is generally copied to the DSCP field of the header of the IP packet supporting GTP over UDP, enabling the information to be accessed for the purpose of routing the packet over the GTPv1-U interface. However, 3G, 4G and in the future 5G packets may carry additional QoS information, specific to the Radio Access Technology (RAT), which cannot be mapped to the DSCP field. Examples of such information include Traffic Handling Priority (THP) in 3G and QoS Class Identifier (QCI) in 4G.

The above described GTPv1-U interfaces, including S1-U, are carried by the MTN network, which is normally operated independently of the RAN and Core Network. However, information available to the RAN and Core Network about the traffic flowing over GTPv1-U interfaces may be useful to the MTN in optimising interface performance and traffic throughput. For example, in order to properly comply with QoS requirements for individual traffic flows, the MTN should be provided with QoS information for individual user packets. As discussed above, basic QoS information is copied to the DSCP field of the IP header and is thus relatively easily available to the MTN network. However, RAT specific QoS information, which would ideally also be taken into account by the MTN, cannot be copied to the DSCP field, and is only known to the RAN and Core Network nodes exchanging traffic over the interface.

Traffic flow information could also be useful to the MTN in implementing load balancing. If the traffic flowing over an interface must be split onto different resources in the MTN, for example if Link Aggregation or Equal Cost Multipath is implemented, packets belonging to the same user flow should be kept on the same physical resource path, in order to avoid packet reordering. The information enabling identification of individual user flows is the TEID number assigned to each packet, which specifies which GTP tunnel the packet belongs to. However, this information is contained in a GTP header field of a user data packet, and Deep Packet Inspection (DPI) is therefore required to access the TEID information for a user packet, and to ensure that load balancing does not separate the packets of individual user flows. DPI is a more resource intensive procedure than standard shallow packet inspection, and not all commercial routers providing a MTN network are able to implement it. In addition, if IPsec tunnels are implemented over the interface, DPI is impossible.

It can be seen from the above discussion that there may be situations in which the MTN network does not have sufficient information about the user data packets being transferred over a GTP interface to manage the routing of the packets over the interface in an optimal manner.

SUMMARY

It is an aim of the present invention to provide a method and apparatus which obviate or reduce at least one or more of the disadvantages mentioned above.

According to a first aspect of the present invention, there is provided a method, performed by a first network node in a communication network, the first network node being connected to a second network node of the communication network via an interface implementing a GPRS Tunnelling Protocol (GTP). The method comprises selecting a user data packet for transmission to the second network node, identifying information about the user data packet which impacts how the user data packet should be routed over the interface and encoding the identified information into a User Datagram Protocol (UDP) header of the user data packet. The method further comprises forwarding the user data packet to the interface for transmission to the second network node.

Examples of first network nodes which may carry out the method include an eNodeB, Serving Gateway (SGW), Packet Data Network Gateway (PGW), Radio Network Controller (RNC), Serving GPRS Support Node (SGSN), Mobile Switching Centre (MSC), Gateway GPRS Support Node (GGSN) etc.

According to examples of the invention, the information about the user data packet which impacts how the user data packet should be routed over the interface may comprise at least one of Quality of Service, QoS, information for the user data packet and/or GTP tunnel information for the user data packet.

According to examples of the invention, the information may comprise both of the above elements or only one or other of the above elements. Different advantages may be afforded by the method of the first aspect of the present invention according to the information identified and encoded into the UDP header.

According to examples of the invention, encoding the identified information into a UDP header of the user data packet may comprise mapping the identified information to a port number of the UDP header. The mapping function may for example comprise a hash function or other examples of mapping function, including for example the use of look-up tables, databases etc.

According to examples of the invention, the port number of the UDP header may comprise the source port number.

According to examples of the invention, identifying information about the user data packet which impacts how the user data packet should be routed over the interface may comprise extracting QoS information from the user data packet.

According to examples of the invention, the QoS information may be specific to a Radio Access Technology.

According to examples of the invention, the QoS information may comprise at least one of a QoS Class Identifier (QCI), and/or a Traffic Handling Priority (THP).

According to examples of the invention, identifying information about the user data packet which impacts how the user data packet should be routed over the interface may comprise identifying a Tunnel Endpoint Identifier (TEID) for the user data packet.

According to examples of the invention, encoding the identified information into a UDP header of the user data packet may comprise mapping the TEID to a composite flow identifier, and mapping the composite flow identifier to a port number of the UDP header, wherein a composite flow is treated as indivisible during routing over the interface.

According to examples of the invention, mapping the TEID to a composite flow identifier may comprise mapping the TEID to a composite flow identifier for a composite flow including user data packets having at least one shared characteristic with the user data packet.

According to examples of the invention, the shared characteristic may comprise a QoS characteristic. The QoS characteristic may include both RAT specific and non RAT specific QoS, such that for example, the group of user data flows having the same RAT and other QoS requirements may be subdivided into composite flows for routing over the interface.

According to examples of the invention, mapping the TEID to a composite flow identifier may comprise extracting a bandwidth requirement for the user data packet, and mapping the TEID to a composite flow identifier such that bandwidth requirements are shared between a plurality of composite flows. The first network node may thus in some examples seek to achieve an even distribution of bandwidth requirements across multiple composite flows.

According to examples of the invention, the GPRS Tunnelling Protocol implemented on the interface may be GTPv1-U, specified in TS29.281.

According to another aspect of the present invention, there is provided a method, performed by a node in a Mobile Transport Network, the Mobile Transport Network providing a GPRS Tunnelling Protocol (GTP) based interface between a first network node of a communication network and a second network node of the communication network. The method comprises receiving a user data packet from the first network node for transmission over the interface to the second network node, extracting, from a User Datagram Protocol (UDP) header of the user data packet, information about the user data packet which impacts how the user data packet should be routed over the interface, and using the extracted information in a routing decision to forward the user data packet to the second network node. In some examples of the invention, the node may for example be a router.

According to examples of the invention, the information about the user data packet which impacts how the user data packet should be routed over the interface may comprise at least one of Quality of Service (QoS) information for the user data packet and/or GTP tunnel information for the user data packet.

According to examples of the invention, extracting the information from the UDP header of the user data packet may comprise mapping a port number of the UDP header to the information about the user data packet which impacts how the user data packet should be routed over the interface.

According to examples of the invention, the port number of the UDP header may comprise the source port number.

According to examples of the invention, the information about the user data packet which impacts how the user data packet should be routed over the interface may comprise QoS information specific to a Radio Access Technology.

According to examples of the invention, the QoS information may comprise at least one of a QoS Class Identifier (QCI), and/or a Traffic Handling Priority (THP).

According to examples of the invention, the information about the user data packet which impacts how the user data packet should be routed over the interface may comprise a Tunnel Endpoint Identifier (TEID) for the user data packet.

According to examples of the invention, extracting the information from the UDP header of the user data packet may comprise mapping a port number of the UDP header of the user data packet to a composite flow identifier, and mapping the composite flow identifier to a TEID for the user data packet According to examples of the invention, the information about the user data packet which impacts how the user data packet should be routed over the interface may comprise a composite flow identifier, wherein a composite flow is treated as indivisible during routing over the interface.

According to examples of the invention, a composite flow may include user data packets having at least one shared characteristic with the user data packet.

According to examples of the invention, the shared characteristic may comprise a QoS characteristic.

According to examples of the invention, the GPRS Tunnelling Protocol implemented on the interface may be GTPv1-U specified in TS29.281.

According to another aspect of the present invention, there is provided a computer program configured, when run on a computer, to carry out a method according to any one of the preceding aspects of the present invention.

According to another aspect of the present invention, there is provided a computer program product comprising computer readable material having stored thereon a computer program according to the preceding aspect of the present invention.

According to another aspect of the present invention, there is provided a first network node in a communication network, the first network node being connected to a second network node of the communication network via an interface implementing a GPRS Tunnelling Protocol (GTP). The first network node comprises a selecting unit for selecting a user data packet for transmission to the second network node, an identifying unit for identifying information about the user data packet which impacts how the user data packet should be routed over the interface, and an encoding unit for encoding the identified information into a User Datagram Protocol (UDP) header of the user data packet. The first network node also comprises a forwarding unit for forwarding the user data packet to the interface for transmission to the second network node.

According to examples of the invention, the identifying unit may be for identifying at least one of Quality of Service (QoS) information for the user data packet and/or GTP tunnel information for the user data packet.

According to examples of the invention, the encoding unit may comprise a mapping unit for mapping the information identified by the identifying unit to a port number of the UDP header.

According to examples of the invention, the port number of the UDP header may comprise the source port number.

According to examples of the invention, the identifying unit may comprise a QoS unit for extracting QoS information from the user data packet.

According to examples of the invention, the QoS information may be specific to a Radio Access Technology.

According to examples of the invention, the QoS information may comprise at least one of a QoS Class Identifier (QCI) and/or a Traffic Handling Priority, THP.

According to examples of the invention, the identifying unit may comprise a TEID unit for identifying a Tunnel Endpoint Identifier (TEID) for the user data packet.

According to examples of the invention, the mapping unit may be for mapping the TEID to a composite flow identifier, and mapping the composite flow identifier to a port number of the UDP header, wherein a composite flow is treated as indivisible during routing over the interface.

According to examples of the invention, the mapping unit may be for mapping the TEID to a composite flow identifier for a composite flow including user data packets having at least one shared characteristic with the user data packet.

According to examples of the invention, the shared characteristic may comprise a QoS characteristic.

According to examples of the invention, the mapping unit may be for mapping the TEID to a composite flow identifier by extracting a bandwidth requirement for the user data packet, and mapping the TEID to a composite flow identifier such that bandwidth requirements are shared between a plurality of composite flows.

According to examples of the invention, the GPRS Tunnelling Protocol implemented on the interface may be GTPv1-U, specified in TS29.281.

According to another aspect of the present invention, there is provided a Mobile Transport Network (MTN) node, the Mobile Transport Network providing a GPRS Tunnelling Protocol (GTP) based interface between a first network node of a communication network and a second network node of the communication network. The MTN node comprises a receiving unit for receiving a user data packet from the first network node for transmission over the interface to the second network node, an extracting unit for extracting, from a User Datagram Protocol (UDP) header of the user data packet, information about the user data packet which impacts how the user data packet should be routed over the interface, and a routing unit for using the extracted information in a routing decision to forward the user data packet to the second network node.

According to examples of the invention, the extracting unit may be for extracting at least one of Quality of Service (QoS) information for the user data packet and/or GTP tunnel information for the user data packet.

According to examples of the invention, the extracting unit may comprise a mapping unit for mapping a port number of the UDP header to the information about the user data packet which impacts how the user data packet should be routed over the interface.

According to examples of the invention, the port number of the UDP header may comprise the source port number.

According to examples of the invention, the extracting unit may be for extracting QoS information specific to a Radio Access Technology.

According to examples of the invention, the QoS information may comprise at least one of a QoS Class Identifier (QCI) and/or a Traffic Handling Priority (THP).

According to examples of the invention, the extracting unit may be for extracting a Tunnel Endpoint Identifier (TEID) for the user data packet.

According to examples of the invention, the mapping unit may be for mapping a port number of the UDP header of the user data packet to a composite flow identifier, and mapping the composite flow identifier to a TEID for the user data packet.

According to examples of the invention, the extracting unit may be for extracting a composite flow identifier, wherein a composite flow is treated as indivisible during routing over the interface.

According to examples of the invention, a composite flow may include user data packets having at least one shared characteristic with the user data packet.

According to examples of the invention, the shared characteristic may comprise a QoS characteristic.

According to examples of the invention, the GPRS Tunnelling Protocol implemented on the interface may be GTPv1-U specified in TS29.281.

According to another example of the present invention, there is provided a first network node in a communication network, the first network node being connected to a second network node of the communication network via an interface implementing a GPRS Tunnelling Protocol (GTP). The first network node comprises a processor and a memory, the memory containing instructions executable by the processor such that the first network node is operable to select a user data packet for transmission to the second network node, identify information about the user data packet which impacts how the user data packet should be routed over the interface and encode the identified information into a User Datagram Protocol, UDP, header of the user data packet. The first network node is also operable to forward the user data packet to the interface for transmission to the second network node.

According to another example of the present invention, there is provided a Mobile Transport Network (MTN) node, the Mobile Transport Network providing a GPRS Tunnelling Protocol (GTP) based interface between a first network node of a communication network and a second network node of the communication network. The MTN node comprises a processor and a memory, the memory containing instructions executable by the processor such that the MTN node is operable to receive a user data packet from the first network node for transmission over the interface to the second network node, extract, from a User Datagram Protocol, UDP, header of the user data packet, information about the user data packet which impacts how the user data packet should be routed over the interface, and use the extracted information in a routing decision to forward the user data packet to the second network node.

BRIEF DESCRIPTION OF THE DRAWINGS

For a better understanding of the present invention, and to show more clearly how it may be carried into effect, reference will now be made, by way of example, to the following drawings in which.

DETAILED DESCRIPTION

Aspects of the present invention provide methods according to which information about a user data packet which impacts how the user data packet should be routed over an interface is encoded into a UDP header of the user data packet before the packet is forwarded to the interface. In one example, QoS and/or GTP tunnel information for the packet may be encoded into a UDP port number, such as the UDP source port number, for the packet. This information is then extracted by a node of the MTN providing the interface and is used in a routing decision for the packet. Information encoded in the UDP header is therefore accessible to MTN nodes providing the interface without the need for DPI or for any additional messaging or storing process, and this information can be used to ensure optimal routing of the packet over the interface.

Figure 3:
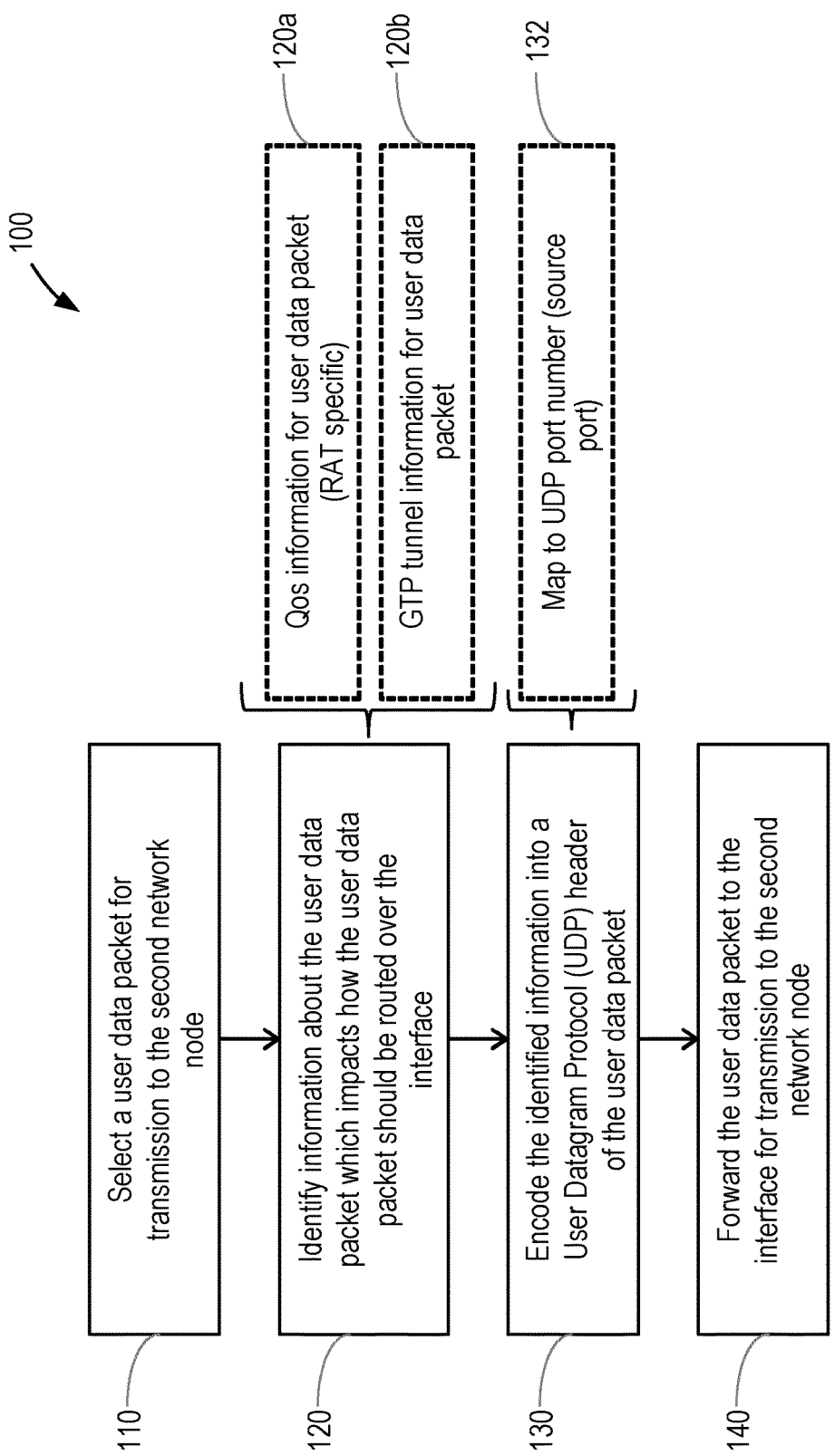
FIG. 3 is a flow chart illustrating process steps in a method performed in a first network node.

FIG. 3 illustrates a first example method 100 which may be conducted in a first network node of a communication network. The network node is connected to a second network node of the communication network via an interface implementing a GTP protocol. The protocol may for example be the GTPv1-U protocol specified in TS 29.281. The first network node may in such examples be any originating or relay node for the GTPv1-U protocol, including for example an eNodeB, SGW, PGW, SGSN, etc.

Referring to FIG. 3, in a first step 110, the first network node selects a user data packet for transmission to the second network node over the interface. In step 120, the first network node then identifies information about the user data packet which impacts how the user data packet should be routed over the interface. As discussed in further detail below with reference to FIG. 4, this information may comprise QoS information for the user data packet as shown in step 120a and/or may comprise GTP tunnel information for the user data packet as shown in step 120b. The QoS information referred to in step 120a may for example be RAT specific QoS information such as a QCI, THP or other RAT specific QoS information. Having identified the information, the first network node then encodes the identified information into a UDP header of the user data packet in step 130. As illustrated in step 132, this encoding step may comprise mapping the information to a UDP port number of the user data packet, and in particular examples, mapping the information to the UDP source port number. It will be appreciated that TS 19.281 specifies a destination UDP port of 2152 but does not specify any particular value for the source port number. By mapping the identified information to the source UDP port number, the first network node leaves the destination UDP port number to be set as 2152 and therefore maintains compatibility with TS 29.281. Having performed the encoding step, the first network node then proceeds, at step 140, to forward the user data packet to the interface for transmission to the second network node.

Figure 1:
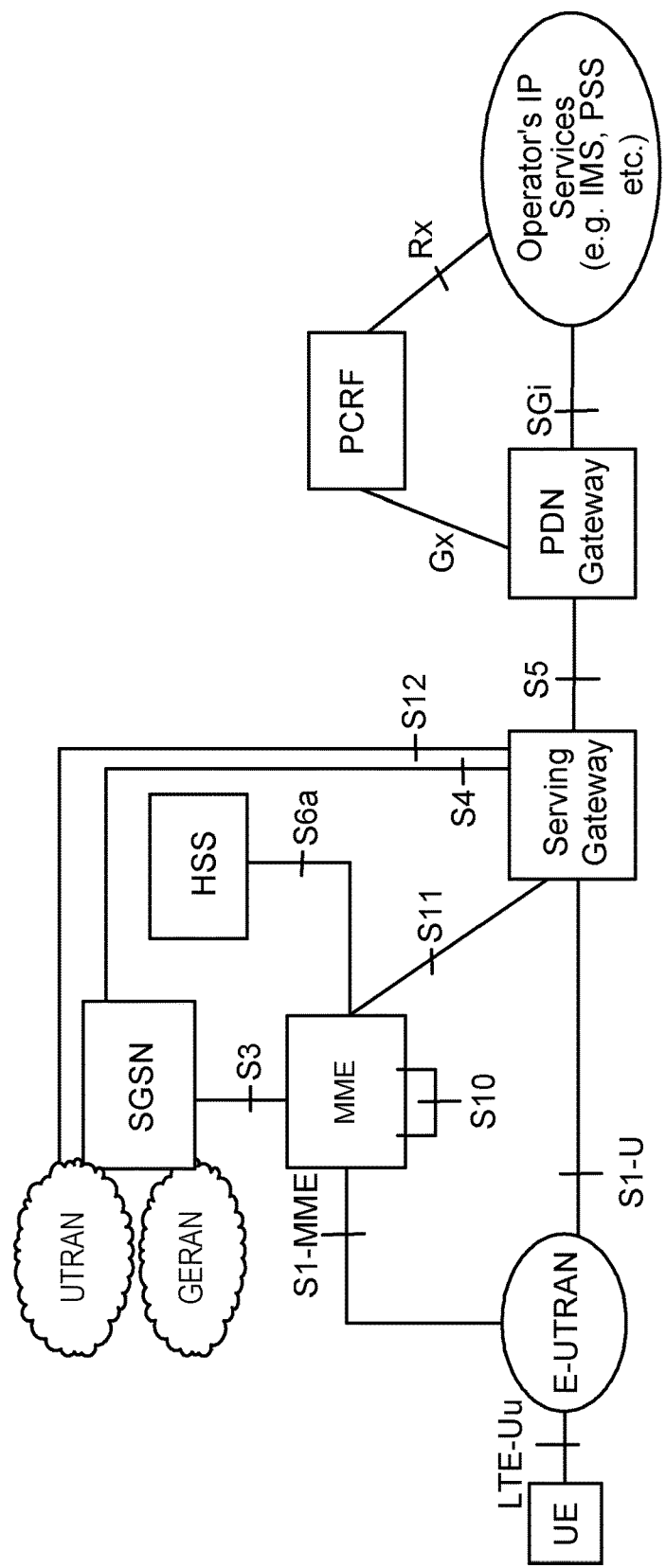
FIG. 1 illustrates an example LTE Radio and Core Network.
Figure 2:
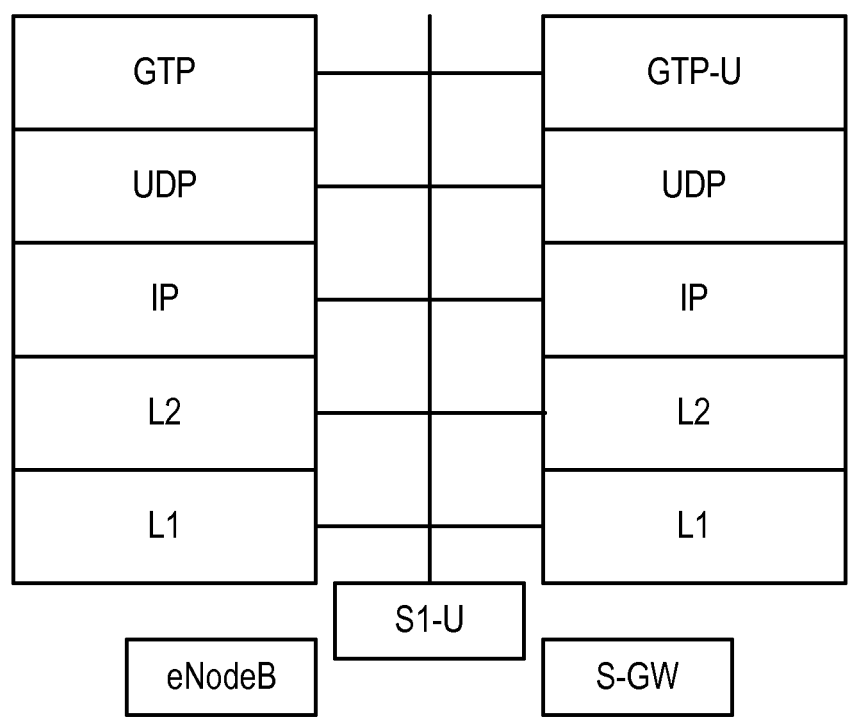
FIG. 2 illustrates the protocol stack of the GTPv1-U protocol used to implement an S1-U interface.
Figure 4:
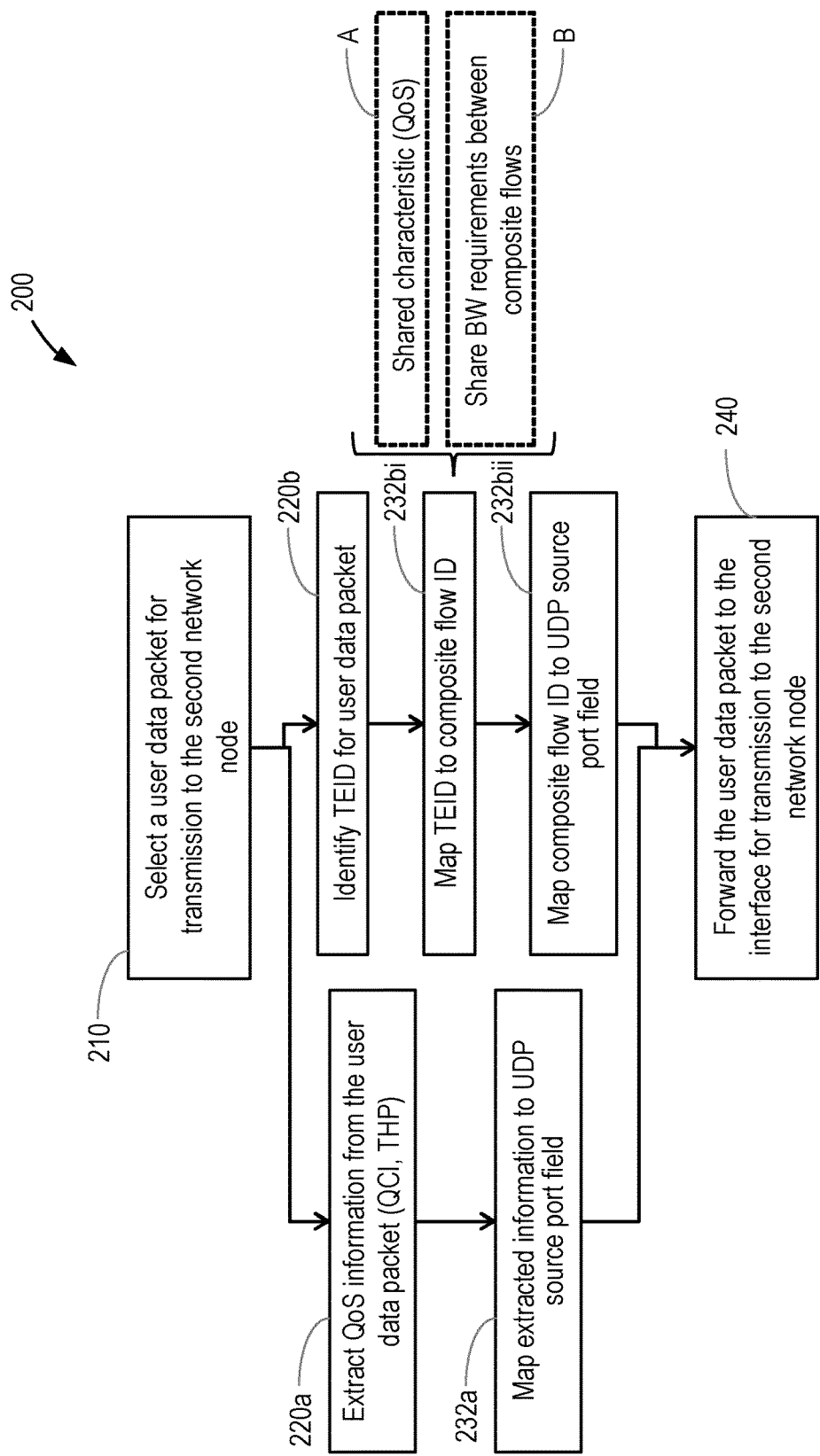
FIG. 4 is a flow chart illustrating process steps in another example of method performed in a first network node.

FIG. 4 illustrates another example method 200 which may be conducted in a first network node of a communication network. The method 200 of FIG. 4 illustrates one way in which some of the steps in the method 100 of FIG. 3 may be supplemented and or subdivided to achieve the above discussed and other functionality. As for the method 100 of FIG. 1, the first network node in which the method is performed is connected to a second network node of the communication network via an interface implementing a GTP protocol, which may be the GTPv1-U protocol. The first network node may for example be any originating or relay node for the GTPv1-U protocol.

Referring to FIG. 4, in a first step 210, the first network node selects a user data packet for transmission to the second network node over the interface. The first network node may then conduct either or both of the streams of steps illustrated at 220a, 232a and 220b, 232bi, 232bii. In step 220a, the first network node extracts QoS information from the user data packet. This QoS information may be included for example in the packet header of the user data packet or may be otherwise associated with the user data packet. As discussed above, the QoS information may be RAT specific QoS information, which cannot be copied to the DSCP field of the IP packet header. The QoS information may for example be a QCI or THP or another RAT specific QoS parameter. In step 232a, the extracted QoS information is mapped to the UDP source port field of the UDP packet header. The mapping function may for example be a hash function or other mapping function, such as a lookup table, database etc. An example mapping function is described in further detail below. In additional or alternative steps, the first network node identifies a TEID for the selected user data packet at step 220b. The TEID may be set by the first network node as part of preparation for transmitting the user data packet over the interface. The first network node then maps the TEID to the source UDP port field of the UDP header of the user data packet. This process may be conducted in two steps, as illustrated in FIG. 4.

The two step process allows for the use of composite flows, which may assemble the user data flows of one or more GTP tunnels having the same general and RAT specific QoS information. Composite flows, also referred to herein as atomic flows, are treated by the MTN as indivisible for the purposes of routing over the interface. The use of composite flows and the mapping process is discussed in further detail below with reference to an example mapping function.

Referring again to FIG. 4, in a first sub step 232bi, the identified TEID is mapped to a composite flow ID. This mapping may ensure that the user data packet and any user data packets already mapped to the composite data flow of the composite data flow ID have a shared characteristic, such as shared QoS information, as illustrated at A. The mapping may also ensure that bandwidth requirements are shared approximately equally between composite flows as illustrated at B, such that all composite flows have, to the extent possible and without dividing user flows, approximately equal bandwidth requirements. In a second sub step 232bii, the first network node maps the composite flow ID to the UDP source port field of the UDP header of the user data packet. Having completed either or both of the mapping steps 232a and 232b, the first network node then forwards the user data packet to the interface for transmission to the second network node.

An example mapping function is described below, using for the purposes of illustration, a range for the source UDP port number of 10000 to 19999. The destination UDP port number is set to be 2152 as required by TS 29.281.

The source port number is considered to be in the format 1QQCC, where QQ is QoS related information for the relevant user data packet, and CC is GTP tunnel information for the user data packet. The QQ field is reserved for RAT specific QoS information, which information is not routinely copied to the DSCP field, and so is not already available to MTN nodes performing routing over the interface. In the case of 3G traffic flows, the value to written to the QQ field may be taken from the THP value of the UMTS flow. In the case of 4G traffic, the value to written to the QQ field may be taken from the QCI field of the LTE flow. In the case of 5G traffic, a QCI filed may be used or some other RAT specific QoS parameter may be defined. In each case, the information may be copied directly to the QQ field from the THP or QCI field, or a hash or other mapping function may be used to transform the THP or QCI information to a format suitable for writing to the QQ field of the UDP source port field. In the case of GPRS flows, the QQ filed may be assigned a value of 00.

As discussed above, traffic having the same general and RAT specific QoS information (for example the same DSCP and QQ values) may be assembled into composite or atomic flows for efficiency of routing. A composite flow carries traffic of a whole number of user flows, identified by the TEID in the GTP protocol, and must be treated as indivisible by the MTN. The number of composite flows assembled by the first network node may vary, depending on the desired granularity. If a total number N of composite flows is configured, then N composite flows are available per RAT QoS per general QoS. The composite flows are identified by a two digit identifier, which may be written directly to the CC field of the UDP source port number field, numbered from 0 to N−1 on two decimal digits. A hashing function may be used to map user flows onto composite flows, with packets having the same TEID being carried on the same composite flow, and hence having the same CC value. As mentioned above, if bandwidth information for individual user flows is available, the mapping may take this information into account, sharing approximately equally the bandwidth requirements of user flows across the composite flows. The individual bandwidth requirements, and the requirement for composite flows to carry only whole numbers of user flows, may prevent perfect balancing of bandwidth requirements between composite flows. However, the mapping function may seek to equalise, within the above mentioned constraints, the bandwidth requirement of each composite flow.

Figure 5:
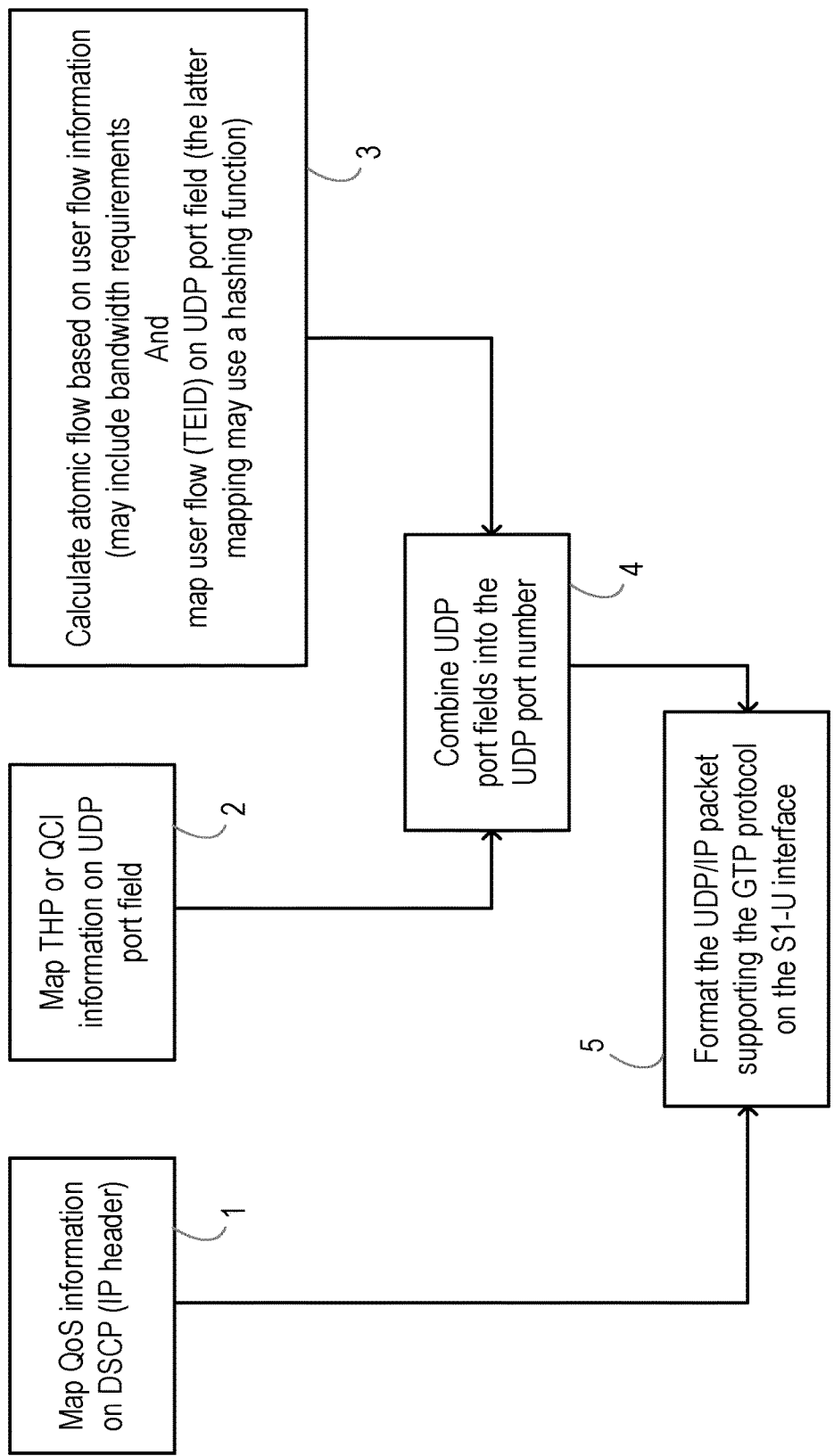
FIG. 5 is a flow chart summarising mapping steps which may be performed according to examples of the methods of FIGS. 3 and 4.

The mapping steps which may be performed according to examples of the methods 100 and 200 are summarised in FIG. 5. Referring to FIG. 5, in a first stage, QoS information that is independent of RAT, and thus referred to as general QoS information, is copied to the DSCP field of the IP header for a user data packet to be transmitted on a GTP interface. In a second stage, RAT specific QoS information such as THP or QCI information is mapped to the UDP source port field of the UDP header of the user data packet. In a third stage, composite or atomic flows are calculated on the basis of user flow information including TEID and, if available, bandwidth information. The TEID is then mapped, for example via a composite flow ID, to the UDP source port field. The QoS information and user flow information are combined in a fourth stage to form the full UDP source port number. Finally, in a fifth stage, the first network node formats the UDP/IP packet of the user data packet on the relevant interface. In the Figure, the example of the S1-U interface is shown, but it will be appreciated that this is merely for the purposes of illustration, and the interface could be any interface implementing a GTP protocol, and particularly the GTPv1-U protocol. The mapping stages thus take information that is either present on the user data packets or locally available, and encode that information into a UDP source port number. The UDP header is then combined with the IP header, including for example a DSCP field, to form the full UDP/IP packet which is transmitted using the GTP protocol.

Figure 6:
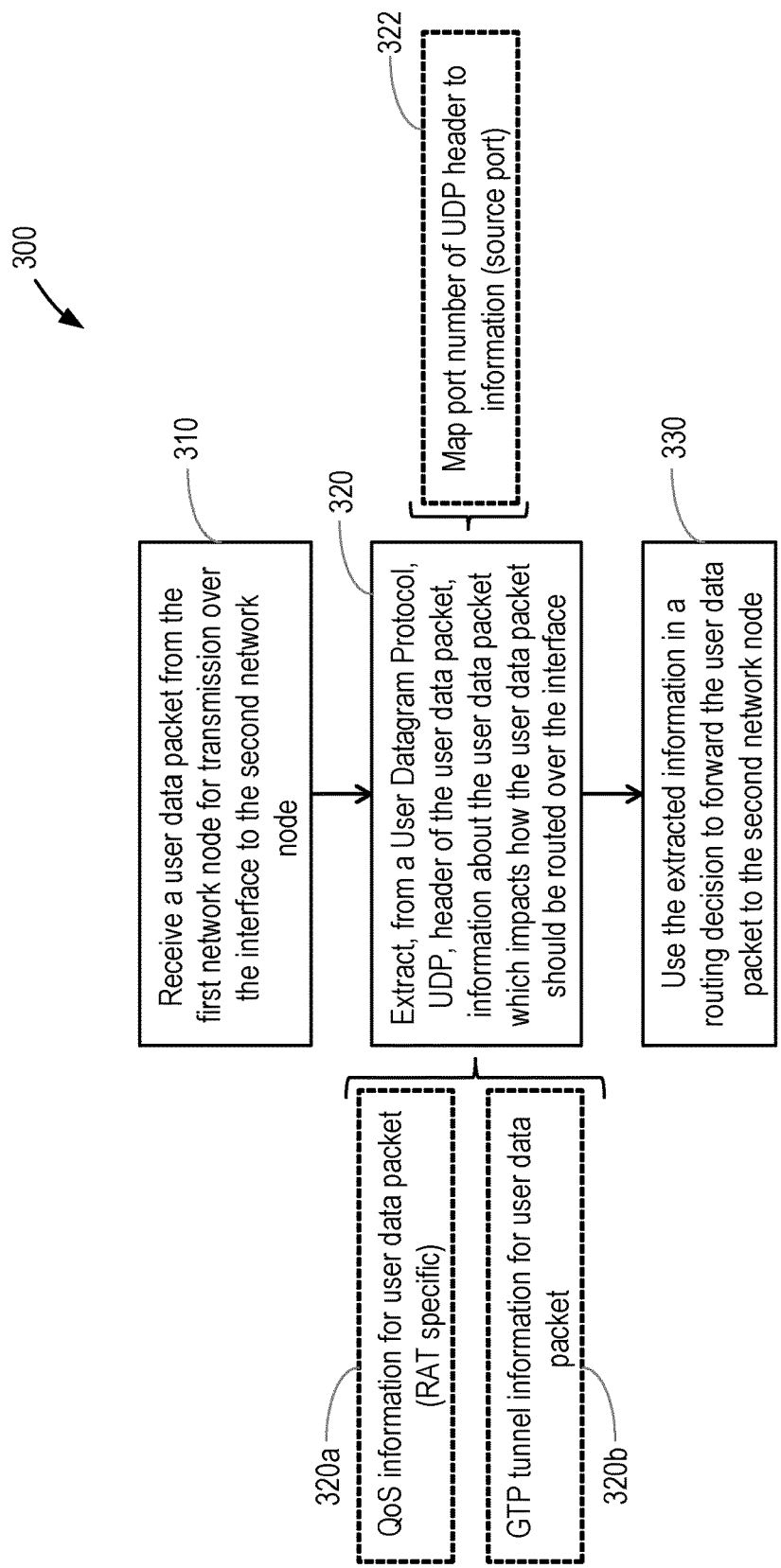
FIG. 6 is a flow chart illustrating process steps in a method performed in a node of a Mobile Transport Network.

As discussed above, the information encoded into the UDP header of a user data packet can be accessed by nodes of the MTN providing the interface between first and second communication nodes, enabling the MTN nodes to take account of this information in routing the packet across the interface. FIG. 6 illustrates process steps in a method 300 which may be carried out in a node of an MTN according to another example of the present invention. The MTN node may for example be a router or other node forming part of the MTN providing a GTP protocol based interface between first and second nodes in a communication network.

Referring to FIG. 6, in a first step 310, the MTN node receives a user data packet from the first network node for transmission over the interface to the second network node. In step 320, the MTN node extracts, from a UDP header of the user data packet, information about the user data packet which impacts how the user data packet should be routed over the interface. This step may comprise mapping a port number, for example the source port number from the UDP header to the information to be extracted, as shown in step 322. The information extracted may be QoS information for the user data packet, including RAT specific QoS information such as QCI or THP, or the information may be GTP tunnel information. These options are illustrated in FIG. 6 at 320a and 320b. Having extracted the information at step 320, the MTN node then uses the extracted information in a routing decision to forward the user data packet to the second network node. The different ways in which the information may be used are discussed in further detail below with reference to FIG. 7.

Figure 7:
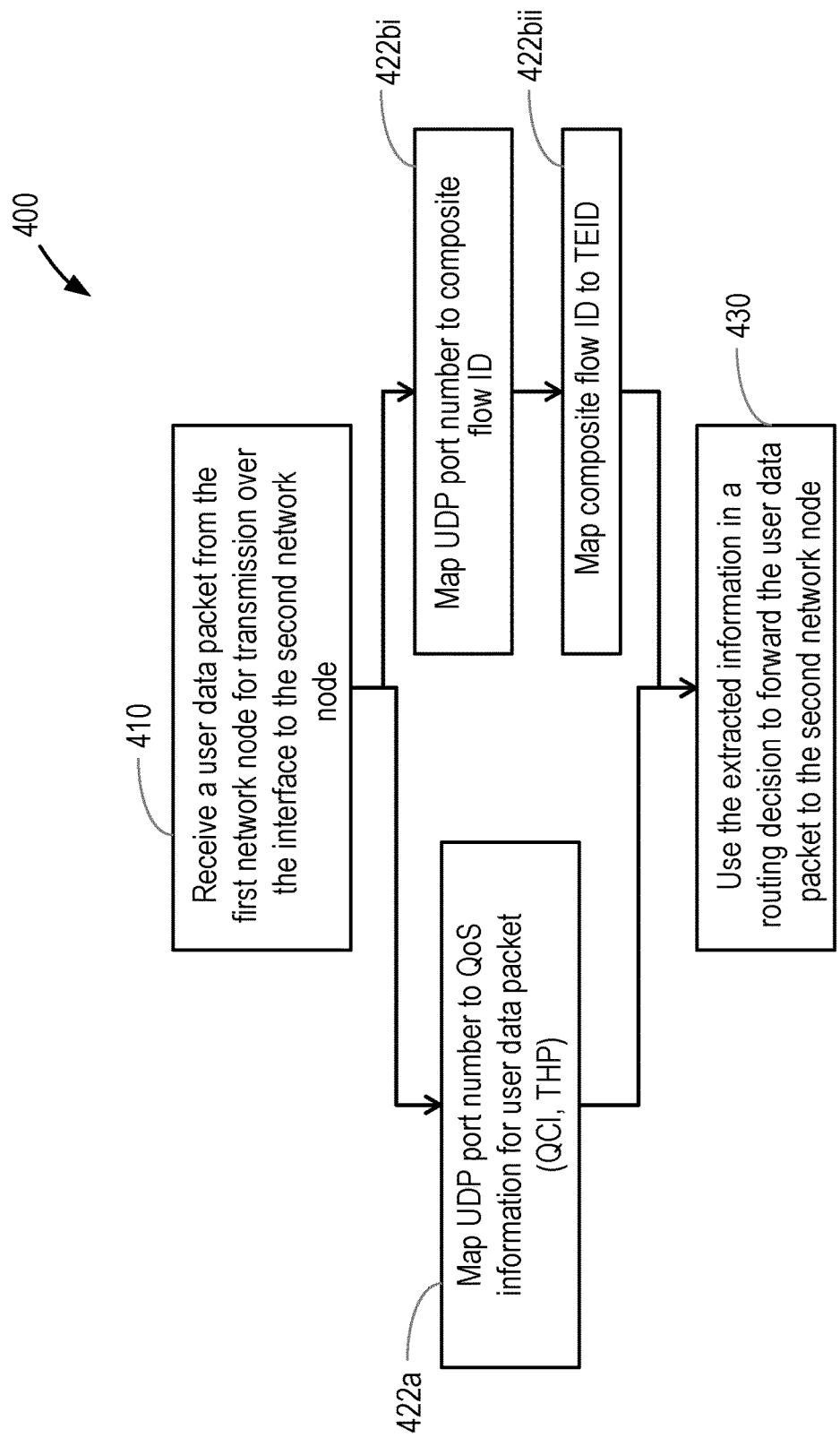
FIG. 7 is a flow chart illustrating process steps in another example of method performed in a node of a Mobile Transport Network.

FIG. 7 illustrates another example method 400 which may be conducted in a node of an MTN providing an interface. The method 400 of FIG. 7 illustrates one way in which some of the steps in the method 300 of FIG. 6 may be supplemented and/or subdivided to achieve the above discussed and other functionality. As for the method 300 of FIG. 6, the MTN node in which the method is performed is part of an MTN providing a GTP protocol based interface between first and second network nodes in a communication network. The GTP protocol implemented over the interface may be GTPv1-U, specified in TS 29.281.

Referring to FIG. 7, in a first step 410, the MTN node receives a user data packet from the first network node for transmission over the interface to the second network node. The MTN node may then perform either or both of the step options illustrated on the left and right of the Figure at 422a and 422bi, 422bii. The MTN node may thus map a UDP port number, for example the UDP source port number, from the UDP header of the user data packet to QoS information for the user data packet in step 422aAs discussed above, the QoS information may be RAT specific QoS information such as QCI or THP. The MTN node may also or alternatively map the UDP port number to a composite flow ID in step 422bi. In some examples of the invention, this composite flow ID may be used as the extracted GTP tunnel information, with the MTN node proceeding directly to step 430 from step 422bi. As discussed above, composite flows are treated by the MTN as inseparable, and the grouping into composite flows performed at the first network node ensures that a single composite flow contains whole numbers of user flows having shared characteristics, such as shared QoS parameters. The MTN node may thus ensure appropriate QoS treatment and load balancing based only on composite flow IDs. In other examples of the invention, the MTN node may proceed to map the composite flow ID to a TEID for the user data packet in step 422bii. In still further examples, if composite flows are not used, steps 422bi and 422bii may be amalgamated, with the MTN node performing a single mapping step to map the encoded information from the UDP header to the TEID for the individual user flow.

The mapping process performed at step 422a and 422bi (and at step 422bii, if performed), may be a reverse of the mapping performed by the first network node in encoding the information into the UDP header. Thus any of direct copying, a hash function, a database or look-up table may be used to extract the information encoded in the UDP header. It will be appreciated that as the information is encoded in the UDP header, it is available in the transport layer and there is no requirement for DPI or other resource intensive procedures to access the information. Additionally, although IPsec generally encrypts UDP information, if IPsec is required for user data packet then additional functionality may be created within the methods according to examples of the present invention to enable the encoded information to remain accessible without the use of DPI.

Having mapped the UDP port number to the relevant information, which may include either or both of QoS and/or flow information, the MTN node then uses the extracted information in a routing decision to forward the user data packet to the second network node in step 430. The information may used to ensure that resources available in the MTN are used as efficiently as possible, while respecting performance requirements for the delivery of the packet, including QoS requirements.

If RAT specific QoS is included in the information extracted from the UDP header, this enables the MTN node to have a complete picture of the QoS requirements for the user data packet. These QoS requirements can therefore be respected in the routing decisions made for the user data packet, ensuring improved perceived performance for an end user.

If traffic flow information such as composite flow IDs (or in some examples TEIDs) is included in the information extracted from the UDP header, then traffic management such as load balancing can be performed without the risk of separating user flows and consequent reordering of packets. Traffic can easily be divided onto different resources simply by respecting a requirement to keep all packets having the same composite flow ID (or TEID) on the same resource. For example, if Ethernet link aggregation (LAG) or Equal Cost Multipath (ECMP) are used, a number of user data flows or composite flows can be split among different resources. If two ECMP paths are available, two composite flows may be sufficient to perform useful load balancing. Unequal Cost Multipath may also be applied, for example during congestion conditions. This would take into account both composite flow (or TEID) information and QoS information, by placing traffic flows which do not have strict QoS requirements on low quality paths, if such low quality paths are expected to have more capacity available. Multiple traffic management options available at the MTN node may benefit from the availability of the information encoded into the UDP header. It will be appreciated that the above discussed examples are merely for the purposes of illustration, and do not represent the full scope of routing decisions which may benefit from taking account of the information encoded into the UDP header of a user data packet according to examples of the invention.

Figure 8:
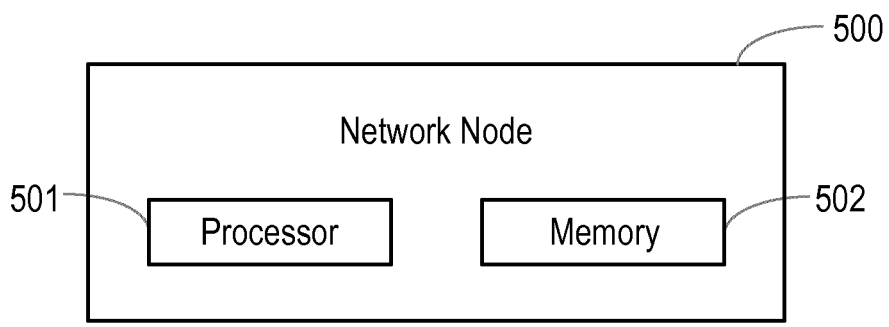
FIG. 8 is a block diagram illustrating functional units in a first network node of a communication network.

As discussed above, the methods 100 and 200 may be carried out by a communication network node such as an eNodeB, SGW, PGW, RNC, SGSN, MSC, GGSN etc. The methods 300 and 400 may be carried out by an MTN node such as a router. FIG. 8 illustrates an example communication network node 500 which may implement the methods 100, 200 for example on receipt of suitable instructions from a computer program. Referring to FIG. 8, the network node 500 comprises a processor 501 and a memory 502. The memory 502 contains instructions executable by the processor 501 such that the network node 500 is operative to conduct some or all of the steps of the methods 100 and/or 200.

Figure 9:
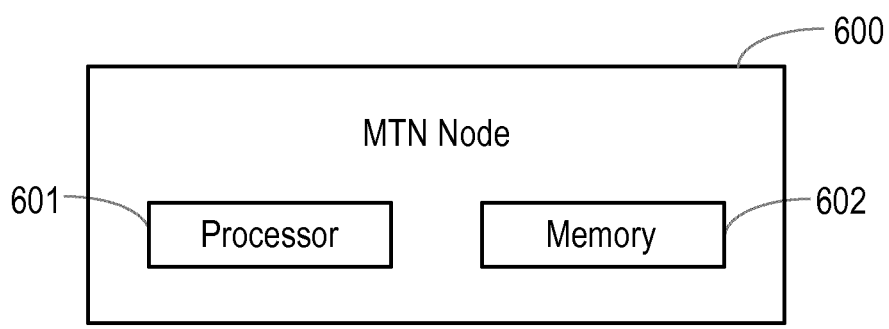
FIG. 9 is a block diagram illustrating functional units in a node of a Mobile Transport Network.

FIG. 9 illustrates an example MTN node 600 which may implement the methods 300, 400 for example on receipt of suitable instructions from a computer program. Referring to FIG. 9, the MTN node 600 comprises a processor 601 and a memory 602. The memory 602 contains instructions executable by the processor 601 such that the MTN node 600 is operative to conduct some or all of the steps of the methods 300 and/or 400.

Figure 10:
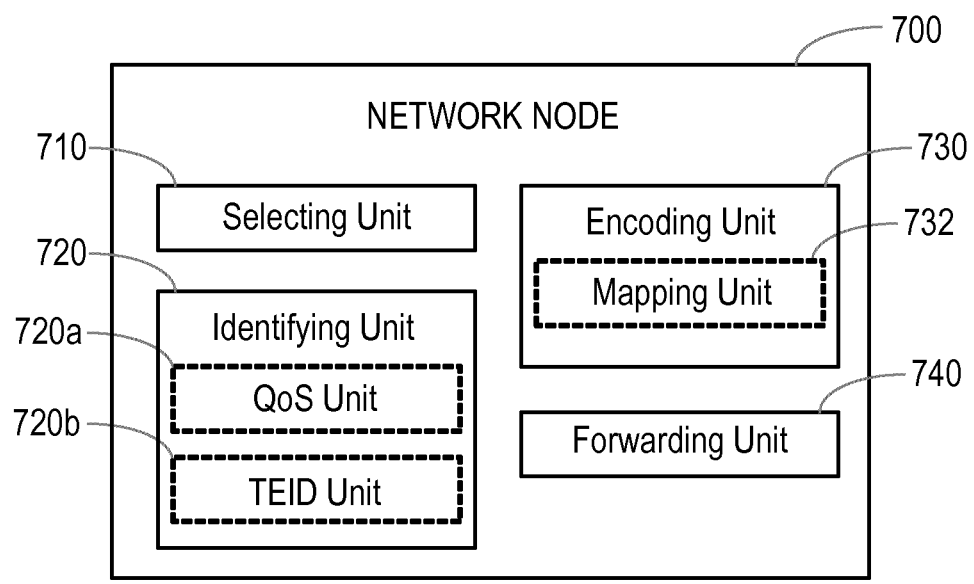
FIG. 10 is a block diagram illustrating functional units in another example of first network node of a communication network.

FIG. 10 illustrates an alternative example of communication network node 700, which may implement the methods 100, 200, for example on receipt of suitable instructions from a computer program. The network node 700 is a first network node and is connected to a second network node of the communication network via an interface implementing a GTP based protocol, which may be GTPv1-U, specified in TS29.281. It will be appreciated that the units illustrated in FIG. 10 may be realised in any appropriate combination of hardware and/or software. For example, the units may comprise one or more processors and one or more memories containing instructions executable by the one or more processors. The units may be integrated to any degree.

Referring to FIG. 10, the first network node 700 comprises a selecting unit 710 for selecting a user data packet for transmission to the second network node, an identifying unit 720 for identifying information about the user data packet which impacts how the user data packet should be routed over the interface, and an encoding unit 730 for encoding the identified information into a UDP header of the user data packet. The first network node 700 also comprises a forwarding unit 740 for forwarding the user data packet to the interface for transmission to the second network node.

The identifying unit 720 may be for identifying at least one of QoS information for the user data packet and/or GTP tunnel information for the user data packet. The identifying unit 720 may comprise a QoS unit 720*a* for extracting QoS information from the user data packet, which QoS information may be specific to a Radio Access Technology, such as QCI or THP. The identifying unit 720 may further comprise a TEID unit 720*b* for identifying a TEID for the user data packet.

The encoding unit 730 may comprise a mapping unit 732 for mapping the information identified by the identifying unit to a port number, which may be the source port number, of the UDP header. The mapping unit 732 may be for mapping the TEID to a composite flow identifier, and mapping the composite flow identifier to a port number of the UDP header, wherein a composite flow is treated as indivisible during routing over the interface. The mapping unit 732 may be for mapping the TEID to a composite flow identifier for a composite flow including user data packets having at least one shared characteristic with the user data packet. The shared characteristic may comprise a QoS characteristic. The mapping unit 732 may also or alternatively be for mapping the TEID to a composite flow identifier by extracting a bandwidth requirement for the user data packet, and mapping the TEID to a composite flow identifier such that bandwidth requirements are shared between a plurality of composite flows.

Figure 11:
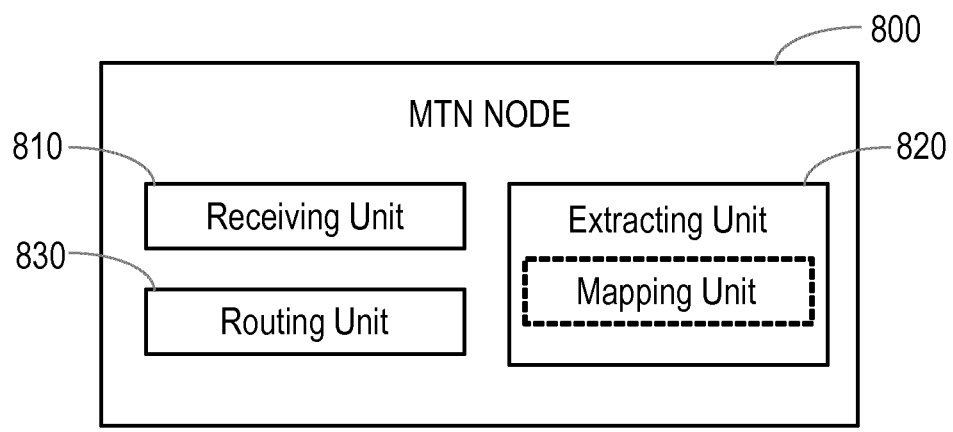
FIG. 11 is a block diagram illustrating functional units in another example of node of a Mobile Transport Network.

FIG. 11 illustrates an alternative example of MTN node 800, which may implement the methods 300, 400, for example on receipt of suitable instructions from a computer program. The MTN node is part of an MTN providing a GTP based interface between first and second network nodes in a communication network. The GTP protocol implemented on the interface may be GTPv1-U, specified in TS 29.281. It will be appreciated that the units illustrated in FIG. 11 may be realised in any appropriate combination of hardware and/or software. For example, the units may comprise one or more processors and one or more memories containing instructions executable by the one or more processors. The units may be integrated to any degree.

Referring to FIG. 11, the MTN node 800 comprises a receiving unit 810 for receiving a user data packet from the first network node for transmission over the interface to the second network node. The MTN node 800 also comprises an extracting unit 820 for extracting, from a UDP header of the user data packet, information about the user data packet which impacts how the user data packet should be routed over the interface, and a routing unit 830 for using the extracted information in a routing decision to forward the user data packet to the second network node.

The extracting unit 820 may be for extracting at least one of QoS information for the user data packet and/or GTP tunnel information for the user data packet. The QoS information may be specific to a Radio Access Technology, and may be QCI or THP. The GTP tunnel information may be a TEID for the user data packet, or may be a composite flow identifier, wherein a composite flow is treated as indivisible during routing over the interface. A composite flow may include user data packets having at least one shared characteristic with the user data packet, which characteristic may be a QoS characteristic.

The extracting unit 820 may comprise a mapping unit 822 for mapping a port number of the UDP header to the information about the user data packet which impacts how the user data packet should be routed over the interface. The port number of the UDP header may be the source port number. The mapping unit may be for mapping a port number of the UDP header of the user data packet to a composite flow identifier, and mapping the composite flow identifier to a TEID for the user data packet.

Aspects of the present invention thus provide methods according to which information which impacts how a user data packet should be routed over an interface is encoded into a UDP header of the packet before forwarding to the interface. This information is then available to nodes of Mobile Transport Network providing the interface, and can be taken into account when making routing decisions in order to optimize transport over the interface. The information may for example be QoS information or may be GTP tunnel information. The information may be encoded into a port number in the UDP header of the user data packet, and in particular examples, may be encoded into the source port number, which number is unspecified in the speciation for the GTPv1-U protocol.

Making available an awareness of QoS and/or flow aggregation information to nodes of an MTN providing an interface allows for improved and optimized use of transport network resources and improved quality of experience for end users. In particular, more complete QoS management and more effective load balancing may be achieved while remaining compatible with current standards and without requiring resource intensive processing such as DPI in the MTN nodes.

The methods of the present invention may be implemented in hardware, or as software modules running on one or more processors. The methods may also be carried out according to the instructions of a computer program, and the present invention also provides a computer readable medium having stored thereon a program for carrying out any of the methods described herein. A computer program embodying the invention may be stored on a computer readable medium, or it could, for example, be in the form of a signal such as a downloadable data signal provided from an Internet website, or it could be in any other form.

It should be noted that the above-mentioned examples illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method, performed by a first network node in a communication network, the first network node being connected to a second network node of the communication network via an interface implementing a General Packet Radio Service (GPRS) Tunneling Protocol (GTP), the method comprising:
  selecting a user data packet for transmission to the second network node, the user data packet being part of a traffic flow having Quality-of-Service (QoS) requirements specific to a Radio Access Technology (RAT);
  identifying information about the user data packet that impacts how the user data packet should be routed over the interface, the information at least comprising RAT-specific QoS information corresponding to the QoS requirements;

encoding the information into a User Datagram Protocol (UDP) header of the user data packet; and
forwarding the user data packet to the interface for transmission to the second network node.

2. The method as claimed in claim 1, wherein the information further comprises
GTP tunnel information for the user data packet.

3. The method as claimed in claim 1, wherein encoding the information into the UDP header of the user data packet comprises mapping the information to a port number of the UDP header.

4. The method as claimed in claim 3, wherein the port number of the UDP header comprises a source port number.

5. The method as claimed in claim 1, wherein identifying the information comprises extracting the RAT-specific QoS information from the user data packet.

6. The method as claimed in claim 5, wherein the RAT-specific QoS information comprises:
a QoS Class Identifier (QCI); and
a Traffic Handling Priority (THP).

7. The method as claimed in claim 1, wherein identifying the information further comprises identifying a Tunnel Endpoint Identifier (TEID) for the user data packet.

8. The method as claimed in claim 7, wherein encoding the information into the UDP header of the user data packet comprises:
mapping the TEID to a composite flow identifier; and
mapping the composite flow identifier to a port number of the UDP header, wherein a composite flow corresponding to the composite flow identifier is treated as indivisible during routing over the interface.

9. The method as claimed in claim 8, wherein the composite flow includes user data packets having at least one shared characteristic with the user data packet.

10. The method as claimed in claim 9, wherein the shared characteristic comprises a QoS characteristic.

11. The method as claimed in claim 8, wherein mapping the TEID to the composite flow identifier comprises:
extracting a bandwidth requirement for the user data packet, as said RAT-specific QoS information; and
mapping the TEID to a composite flow identifier such that bandwidth requirements are shared between a plurality of composite flows.

12. The method as claimed in claim 1, wherein the GPRS Tunneling Protocol implemented on the interface is GPRS Tunneling Protocol User Plane (GTPv1-U).

13. A method, performed by a node in a Mobile Transport Network, the Mobile Transport Network providing a General Packet Radio Service (GPRS) Tunneling Protocol (GTP) based interface between a first network node of a communication network and a second network node of the communication network, the method comprising:
receiving a user data packet from the first network node for transmission over the interface to the second network node, the user data packet being part of a traffic flow having Quality-of-Service (QoS) requirements specific to a Radio Access Technology (RAT);
extracting, from a User Datagram Protocol (UDP) header of the user data packet, information about the user data packet that impacts how the user data packet should be routed over the interface, the information at least comprising RAT-specific QoS information corresponding to the QoS requirements; and
using the information in a routing decision to forward the user data packet to the second network node.

14. The method as claimed in claim 13, wherein the information further comprises
GTP tunnel information for the user data packet.

15. The method as claimed in claim 13, wherein extracting the information from the UDP header of the user data packet comprises mapping a port number of the UDP header to the information.

16. The method as claimed in claim 15, wherein the port number of the UDP header comprises a source port number.

17. The method as claimed in claim 13, wherein the RAT-specific QoS information comprises:
a QoS Class Identifier (QCI); and
a Traffic Handling Priority (THP).

18. The method as claimed in claim 13, wherein the information further comprises a Tunnel Endpoint Identifier (TEID) for the user data packet.

19. The method as claimed in claim 18, wherein extracting the information from the UDP header of the user data packet comprises:
mapping a port number of the UDP header of the user data packet to a composite flow identifier; and
mapping the composite flow identifier to a TEID for the user data packet.

20. The method as claimed in claim 19, wherein a composite flow corresponding to the composite flow identifier includes user data packets having at least one shared characteristic with the user data packet.

21. The method as claimed in claim 20, wherein the shared characteristic comprises a QoS characteristic.

22. The method as claimed in claim 13, wherein the information further comprises a composite flow identifier, wherein a composite flow corresponding to the composite flow identifier is treated as indivisible during routing over the interface.

23. The method as claimed in claim 13, wherein the GPRS Tunneling Protocol implemented on the interface is GPRS Tunneling Protocol User Plane (GTPv1-U).

24. A non-transitory computer readable medium storing a computer program comprising instructions that, when run on a processor of a first network node in a communication network, the first network node being connected to a second network node of the communication network via an interface implementing a General Packet Radio Service (GPRS) Tunneling Protocol (GTP), causes the processor to:
select a user data packet for transmission to the second network node, the user data packet being part of a traffic flow having Quality-of-Service (QoS) requirements specific to a Radio Access Technology (RAT);
identify information about the user data packet that impacts how the user data packet should be routed over the interface, the information at least comprising RAT-specific QoS information corresponding to the QoS requirements;
encode the information into a User Datagram Protocol (UDP) header of the user data packet; and
forward the user data packet to the interface for transmission to the second network node.

25. A non-transitory computer readable medium storing a computer program comprising instructions that, when run on a processor of a node in a Mobile Transport Network, the Mobile Transport Network providing a General Packet Radio Service (GPRS) Tunneling Protocol (GTP) based interface between a first network node of a communication network and a second network node of the communication network, causes the processor to:
receive a user data packet from the first network node for transmission over the interface to the second network node, the user data packet being part of a traffic flow having Quality-of-Service (QoS) requirements specific to a Radio Access Technology (RAT);

extract, from a User Datagram Protocol (UDP) header of the user data packet, information about the user data packet that impacts how the user data packet should be routed over the interface, the information at least comprising RAT-specific QoS information corresponding to the QoS requirements; and use the information in a routing decision to forward the user data packet to the second network node.

26. A first network node in a communication network, the first network node being connected to a second network node of the communication network via an interface implementing a General Packet Radio Service (GPRS) Tunneling Protocol (GTP), the first network node comprising:

communication circuitry for communicating with the second network node; and processing circuitry operatively associated with the communication circuitry and configured to:

select a user data packet for transmission to the second network node, the user data packet being part of a traffic flow having Quality-of-Service (QoS) requirements specific to a Radio Access Technology (RAT);

identify information about the user data packet that impacts how the user data packet should be routed over the interface, the information at least comprising RAT-specific QoS information corresponding to the QoS requirements;

encode the identified information into a User Datagram Protocol (UDP) header of the user data packet; and forward the user data packet to the interface for transmission to the second network node.

27. The first network node as claimed in claim 26, wherein the information further includes GTP tunnel information for the user data packet.

28. The first network node as claimed in claim 26, wherein the processing circuitry is configured to encode the information by mapping the information to a port number of the UDP header.

29. The first network node as claimed in claim 28, wherein the port number of the UDP header comprises a source port number.

30. The first network node as claimed in claim 26, wherein the processing circuitry is configured to identify the information by extracting the RAT-specific QoS information from the user data packet.

31. The first network node as claimed in claim 30, wherein the RAT-specific QoS information comprises:

a QoS Class Identifier (QCI); and a Traffic Handling Priority (THP).

32. The first network node as claimed in claim 26, wherein the processing circuitry is configured to identify a Tunnel Endpoint Identifier (TEID) for the user data packet.

33. The first network node as claimed in claim 32, wherein the processing circuitry is configured to:

encode the information by mapping the information identified by the identifying unit to a port number of the UDP header map the TEID to a composite flow identifier; and map the composite flow identifier to the port number of the UDP header, wherein a composite flow corresponding to the composite flow identifier is treated as indivisible during routing over the interface.

34. The first network node as claimed in claim 33, wherein the composite flow includes user data packets having at least one shared characteristic with the user data packet.

35. The first network node as claimed in claim 34, wherein the shared characteristic comprises a QoS characteristic.

36. The first network node as claimed in claim 33, wherein the processing circuit is configured to map the TEID to the composite flow identifier by:

extracting a bandwidth requirement for the user data packet, as said RAT-specific QoS requirement; and mapping the TEID to a composite flow identifier such that bandwidth requirements are shared between a plurality of composite flows.

37. The first network node as claimed in claim 26, wherein the GPRS Tunneling Protocol implemented on the interface is GPRS Tunneling Protocol User Plane (GTPv1-U).

38. A Mobile Transport Network (MTN) node, the Mobile Transport Network providing a General Packet Radio Service (GPRS) Tunneling Protocol (GTP) based interface between a first network node of a communication network and a second network node of the communication network, the MTN node comprising:

communication circuitry for receiving and sending user data packets; and processing circuitry operatively associated with the communication circuitry and configured to:

receive a user data packet from the first network node for transmission over the interface to the second network node, the user data packet being part of a traffic flow having Quality-of-Service (QoS) requirements specific to a Radio Access Technology (RAT);

extract, from a User Datagram Protocol (UDP) header of the user data packet, information about the user data packet that impacts how the user data packet should be routed over the interface, the information at least comprising RAT-specific QoS information corresponding to the QoS requirements; and use the information in a routing decision to forward the user data packet to the second network node.

39. The MTN node as claimed in claim 38, wherein the information further includes GTP tunnel information for the user data packet.

40. The MTN node as claimed in claim 38, wherein the processing circuitry is configured to extract the information by mapping a port number of the UDP header to the information.

41. The MTN node as claimed in claim 40, wherein the port number of the UDP header comprises a source port number.

42. The MTN node as claimed in claim 38, wherein the RAT-specific QoS information comprises:

a QoS Class Identifier (QCI); and a Traffic Handling Priority (THP).

43. The MTN node as claimed in claim 38, wherein the processing circuitry is configured to extract a Tunnel Endpoint Identifier (TEID) for the user data packet.

44. The MTN node as claimed in claim 43, wherein the processing circuitry is configured to:

extract the information by mapping a port number of the UDP header to the information;

map the port number of the UDP header of the user data packet to a composite flow identifier; and map the composite flow identifier to a TEID for the user data packet.

45. The MTN node as claimed in claim 44, wherein a composite flow corresponding to the composite flow identifier includes user data packets having at least one shared characteristic with the user data packet.

46. The MTN node as claimed in claim 45, wherein the shared characteristic comprises a QoS characteristic.

47. The MTN node as claimed in claim 38, wherein the processing circuitry is configured to extract a composite flow identifier, wherein a composite flow is treated as indivisible during routing over the interface.

48. The MTN node as claimed in claim 38, wherein the GPRS Tunneling Protocol implemented on the interface is GPRS Tunneling Protocol User Plane (GTPv1-U).

* * * * *